(12) United States Patent
Hirschberg et al.

(10) Patent No.: US 7,664,235 B2
(45) Date of Patent: Feb. 16, 2010

(54) METHOD AND APPARATUS FOR VOICE MAIL NOTES

(75) Inventors: Julia Hirschberg, Cranford, NJ (US); Lawrence David Jackel, Holmdel, NJ (US); Stephen Whittaker, Morristown, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 12/171,060

(22) Filed: Jul. 10, 2008

(65) Prior Publication Data

US 2008/0267368 A1   Oct. 30, 2008

Related U.S. Application Data

(63) Continuation of application No. 10/456,747, filed on Jun. 6, 2003, now Pat. No. 7,453,991, which is a continuation-in-part of application No. 10/361,893, filed on Feb. 10, 2003, now abandoned, which is a continuation of application No. 09/457,189, filed on Dec. 8, 1999, now abandoned.

(51) Int. Cl.
*H04M 1/64* (2006.01)

(52) U.S. Cl. ................................ 379/68; 379/88.23

(58) Field of Classification Search .............. 379/88.14, 379/88.22, 67.1, 88.13, 201.01, 68, 88.23; 704/270, 243, 206
See application file for complete search history.

(56) References Cited

U.S. PATENT DOCUMENTS

| | | | |
|---|---|---|---|
| 4,757,525 A | 7/1988 | Matthews et al. | |
| 5,568,540 A | 10/1996 | Greco et al. | |
| 5,655,006 A * | 8/1997 | Cox et al. ................. | 379/67.1 |
| 5,742,736 A | 4/1998 | Haddock | |
| 5,794,249 A | 8/1998 | Orsolini et al. | |
| 5,799,063 A | 8/1998 | Krane | |
| 5,835,667 A | 11/1998 | Wactlar et al. | |
| 5,870,454 A | 2/1999 | Dahlen | |
| 5,884,262 A | 3/1999 | Wise | |
| 5,889,840 A | 3/1999 | Lang et al. | |
| 5,926,524 A * | 7/1999 | Taylor ...................... | 379/88.08 |
| 5,978,799 A | 11/1999 | Hirsch | |
| 6,327,343 B1 | 12/2001 | Epstein et al. | |
| 6,350,066 B1 | 2/2002 | Bobo, II | |
| 6,449,342 B1 * | 9/2002 | Johanson ................. | 379/88.11 |
| 6,490,563 B2 | 12/2002 | Hon et al. | |
| 6,526,128 B1 * | 2/2003 | Kermani .................. | 379/88.22 |
| 2001/0044724 A1 | 11/2001 | Hon et al. | |
| 2002/0110226 A1 | 8/2002 | Kovales et al. | |

FOREIGN PATENT DOCUMENTS

EP          586954          3/1994

(Continued)

OTHER PUBLICATIONS

Lucent Technologies Bell Innovations, "Lucent Message Manager," XP-000962373, Issue 2, Nov. 1999, BNS pp. 1-15.

(Continued)

*Primary Examiner*—Olisa Anwah

(57) ABSTRACT

A novel method and apparatus for recording an audio note for a voice message stored on a messaging platform are disclosed.

21 Claims, 7 Drawing Sheets

FOREIGN PATENT DOCUMENTS

| | | |
|---|---|---|
| EP | 679005 | 3/1995 |
| EP | 856979 | 8/1998 |
| EP | 856980 | 8/1998 |
| EP | 886227 | 12/1998 |
| WO | WO 96/37989 | 11/1996 |

OTHER PUBLICATIONS

"Onix Test Retrieval Toolkit," Onix Manual, Sep. 3, 1999, http://www.lextek.com/onix/manual/index.html.

* cited by examiner

METHOD AND APPARATUS FOR VOICE MAIL NOTES

CROSS-REFERENCE TO RELATED APPLICATION

This application is a continuation application of U.S. patent application Ser. No. 10/456,747 filed Jun. 6, 2003, which is a continuation in part application of U.S. patent application Ser. No. 10/361,983 filed Feb. 10, 2003, which is a continuation of U.S. patent application Ser. No. 09/457,189 filed Dec. 8, 1999, the contents of which are included herein in their entirety.

BACKGROUND OF THE INVENTION

The present invention relates to the field of voice mail messaging systems. Voice mail messaging systems provide telephone users with great convenience. Through the use of such systems, telephone users are able to leave messages for subscribers of the voice mail messaging systems, and the subscribers are able to retrieve their messages remotely. A subscriber of a voice mail messaging system usually connects to the voice mail messaging system through a network. Typically, the network is the public switched phone network, and the voice mail messaging system includes at least one voice mail server. Once the subscriber connects to the voice mail messaging system, she can retrieve any voice messages that have been left for her on the voice mail messaging system.

Often, a subscriber will have a need for taking notes while listening to her messages. Such notes may include a telephone number, address or name present in a retrieved message, or can more broadly contain any information, including information that the subscriber wishes to remember later in connection with a retrieved message. A subscriber in the process of retrieving messages, however, frequently cannot conveniently take notes by typing or writing. For example, the subscriber may be driving, in which case the subscriber's hands and eyes are unavailable for taking notes, or the subscriber may be walking, in which case no stable or convenient writing platform is available. Furthermore, the subscriber may be physically-impaired such that taking notes by typing or writing is inconvenient or even impossible.

Additionally, a subscriber taking a note by hand or by other traditional means while listening to her messages will not at a later time be able to easily retrieve the note given the corresponding message or vice versa. In such a situation, it is convenient to have a note retrievably associated with the voice message to which it corresponds, such that retrieval of the note allows easy or automatic retrieval of the voice message, and vice versa.

U.S. Pat. No. 5,732,216 ("'216 patent") describes a communication system for distributing audio recordings among a plurality of subscribers in which each subscriber is provided with a player/recorder unit. A subscriber, while listening to a distributed program, may utilize the recorder to comment upon the program. The communication system, for example, allows the subscriber to review and respond to voice messages by recording corresponding audio notes while commuting or traveling to more productively utilize travel time. Such audio notes may be stored in separate files that are uploaded to a host and keyed to the voice messages they annotate.

However, the communication system disclosed in the '216 patent, because it requires a player/recorder unit on the subscriber's end, does not allow for the provision of services directly from the host to the subscriber. A player/recorder unit as disclosed in the '216 patent first downloads a voice message from the host. The subscriber, while playing back the downloaded voice message may record an audio note. Finally, the audio note is uploaded to the host for storage and keyed to the voice messages it annotates.

A voice mail service provider is disadvantaged in many respects in implementing a communication system as disclosed in the '216 patent. First, the service provider must distribute a player/recorder unit to each new subscriber. Second, the service provider or a second service provider must provide maintenance services for the player/recorder units. Third, any upgrade of software of the communication system that is resident on the player/recorder units will require a recall of the player/recorder units. Additionally, unauthorized copying of such software may occur, because the software is resident on player/recorder units which are not in the possession of the service provider. Fourth, billing for provided services, and in particular for voice mail annotation services, is dependent on an upload of a usage log tracking the subscriber's utilization of services from the subscriber's player/recorder unit to the host. Problems in uploading or malfunction of the player/recorder unit may lead to delayed or inaccurate billing, or theft of service by a subscriber.

Therefore, it is desirable to provide for a method and apparatus for taking notes corresponding to voice messages stored on a voice mail messaging system that can be implemented directly from the messaging platform or the host without the use of a special device on the subscriber's side.

SUMMARY OF THE INVENTION

A novel method and apparatus for recording an audio note for a voice message stored in a voice mail messaging system or a messaging platform are disclosed. The steps in a method embodiment comprise replaying a voice message from a messaging platform to a subscriber through a network; receiving a record command from the subscriber through the network; recording an audio note transmitted through the network, the recording occurring while replay of the voice message is suspended; and, associating the audio note with the voice message.

DETAILED DESCRIPTION

Embodiments of the present invention allow for recording an audio note indexed to a portion of a voice message stored on a messaging platform without the use of a special device on the subscriber's side. These embodiments allow for flexible use without the limitations and disadvantages described above in connection with the invention disclosed in the '216 patent.

Typically, a messaging platform, which can include one or more voice mail servers, will be capable of being connected to a plurality of subscribers through a network. A subscriber wishing to check her voice mail can connect to the messaging platform through the network and retrieve any messages left her by a telephone user (including subscribers).

Figure 6:
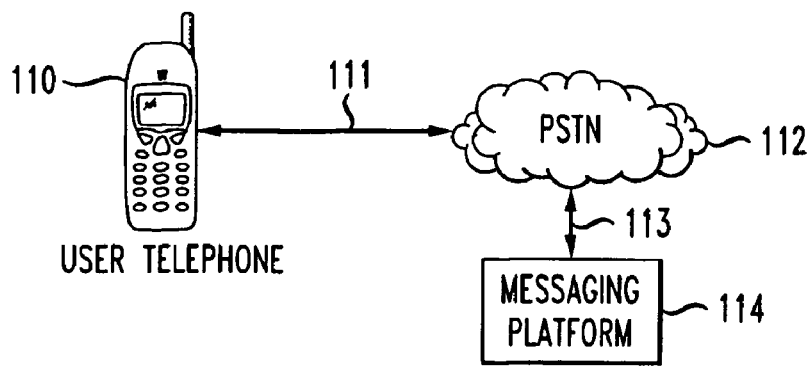
FIG. 6 is a communication system in accordance with embodiments of the present invention.

FIG. 6 shows a communication network in accordance with embodiments of the present invention. A user telephone 110 is connected via communications path 111 to the public switched telephone network ("PSTN") 112. The term "communications path" is meant to encompass both a land-based line connection and a wireless connection. PSTN 112 is connected to a messaging platform 114 via communications path 113. User telephone 110 may be any type of telephone, including a wireless or cellular telephone, or the like. Messaging platform 114 includes a computer (or computers) running the appropriate software to allow voice mail subscribers or users to store and retrieve voice mail or messages, and to allow the users to store and retrieve notes as provided by the present invention. Messaging platform 114 also includes a speech recognition system for recognizing speech uttered from a user, and for recognizing specific words. Messaging platform 114 may have speech recognition capability or DTMF Cut-Through capability allowing a subscriber to interrupt playback of a voice message on messaging platform 114.

Figure 7:
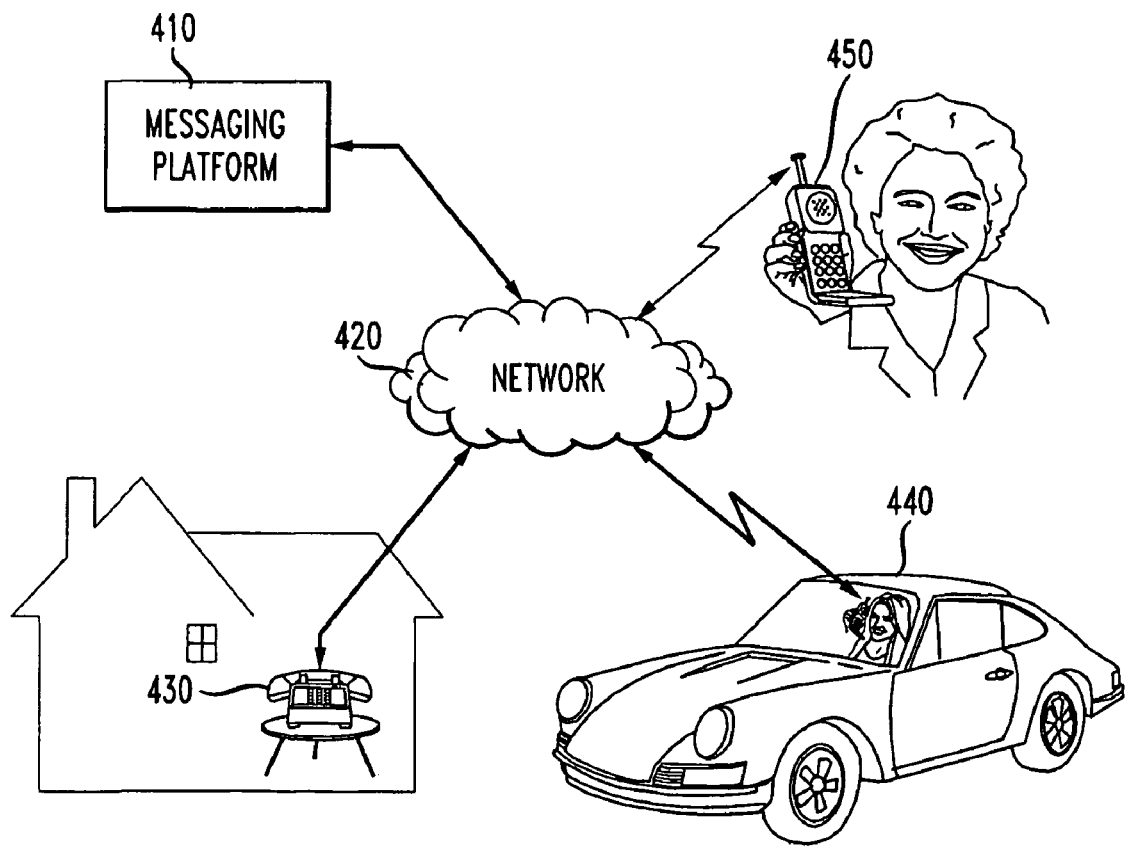
FIG. 7 is another communication system in accordance with embodiments of the present invention.

FIG. 7 shows another communication network in accordance with embodiments of the present invention. In this communication network, messaging platform 410 is connected to network 420. The messaging platform may include a voice mail server (not shown). Network 420 may include one or more wireless networks and land-line networks, the PSTN, the Internet, an intranet or another type of network. Network 420 is additionally connected to user 430, wireless user 450 and mobile user 440. Users 430, 450 and 440 may be subscribers to a voice mail messaging service by which subscribers, and users of network 420 who are not subscribers, are able to leave voice messages for subscribers. The subscribers, in turn, have the ability to retrieve their voice messages from the voice mail messaging service. The voice mail messaging service may be implemented at least in part through the use of messaging platform 410. A communication network as shown in FIG. 7 may include many users, many subscribers, many messaging platforms and many networks.

Figure 1:
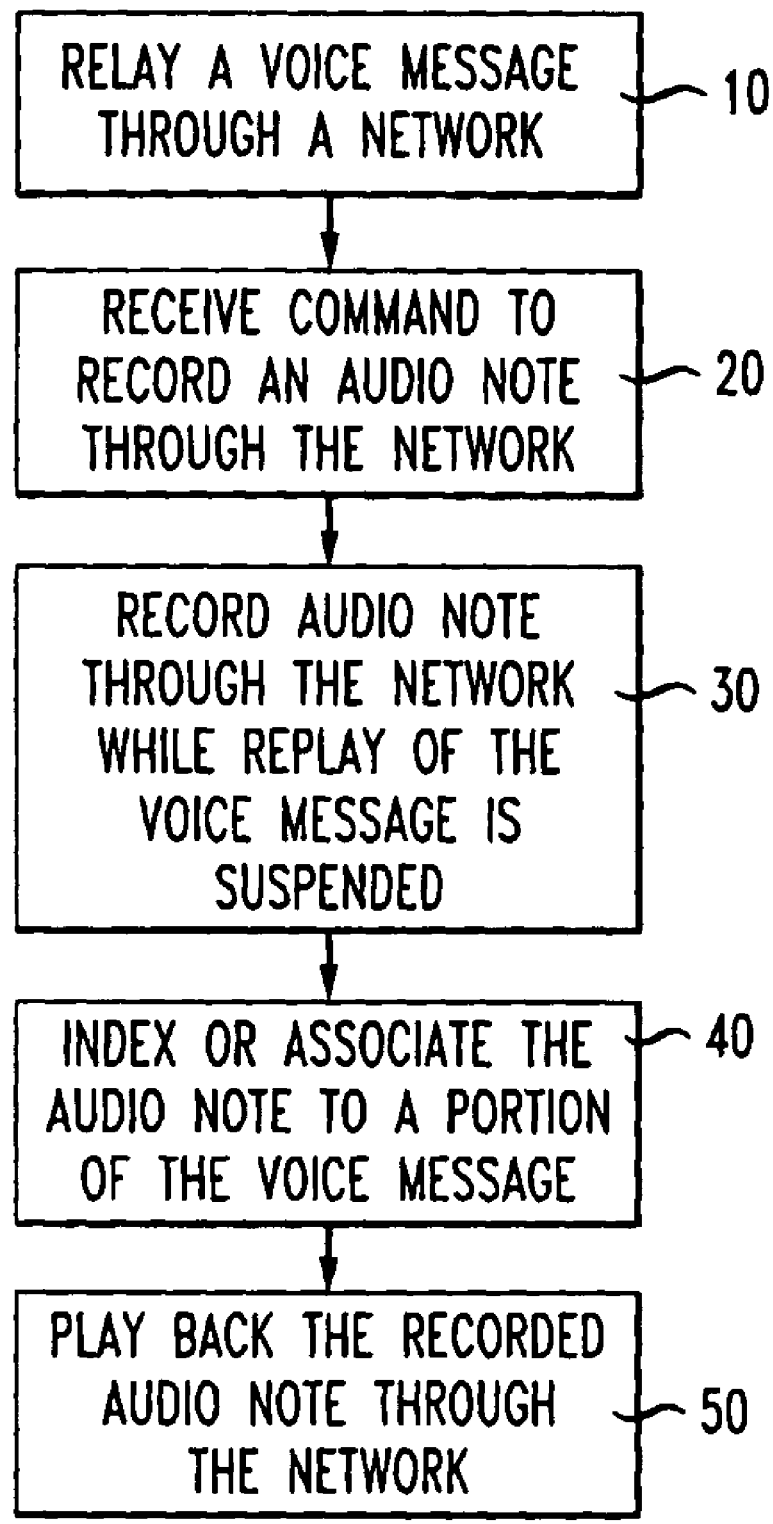
FIG. 1 illustrates a flow diagram of a method embodiment of the present invention in which a host provides a subscriber with the capability to record an audio note corresponding to a voice message.

FIG. 1 illustrates a method for recording an audio note in accordance with an embodiment of the present invention. In this embodiment, users of a communication network may leave voice messages for a subscriber on the messaging platform. The subscriber may retrieve her voice messages from the messaging platform by placing a call or otherwise connecting to the messaging platform. The messaging platform, which may be at a host location remote from the subscriber location, provides a subscriber with the capability to record an audio note corresponding to a voice message. At step 10, replay of a voice message from the messaging platform to a subscriber through the network is begun. For example, the messaging platform may begin playback of a voice message upon direction by the subscriber. At step 20, a record command is received from the subscriber through the network. For example, a subscriber can send a record command by pressing one of the keys on her phone to suspend replay of the voice message and to record an audio note. At step 30, the subscriber's audio note is recorded after transmission through the network while replay of the voice message is suspended. For example, the subscriber may speak the audio note into her telephone to record the audio note onto the messaging platform. The recording may be in analog or digital, or compressed digital format.

At step 40, the recorded audio note is associated with the corresponding voice message or is indexed to a portion of the voice message. Associating in this context refers to storing information sufficient to determine, at a later time, the voice message corresponding to an audio note and/or determine the audio note(s) corresponding to a voice message. Such associating or indexing may be performed where both the audio note and the voice message are digitally stored, by storing identification information in the headers of the stored audio note, the voice message, or a table. For example, an audio note may be associated with its corresponding voice message by storing the identity of the corresponding voice message, e.g. a voice message identification number, in a header to the audio note. Indexing will be discussed in greater detail during the description of FIG. 5, below. At step 50, the recorded audio note is played back through the network. For example, the subscriber may instruct the messaging platform to playback an audio note stored earlier on the messaging platform.

Figure 2:
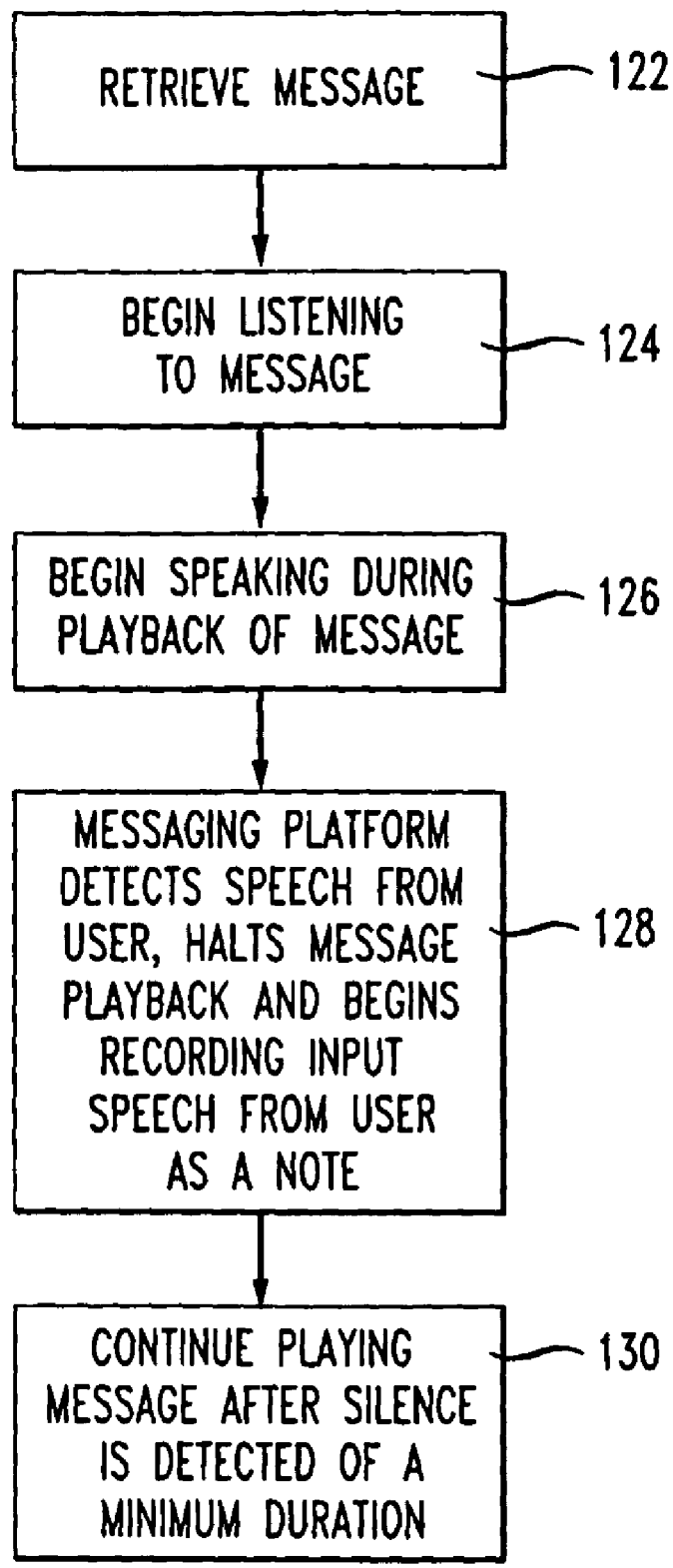
FIG. 2 is a flow diagram of a second embodiment for providing a subscriber with the capability to record an audio note corresponding to a voice message.

FIG. 2 shows another method for recording an audio note in accordance with another embodiment of the present invention. At step 122, a user uses a telephone (for example telephone 110 of FIG. 6) to retrieve a message from a messaging platform (for example messaging platform 114 of FIG. 6). Step 122 may include inputting a mail box number and a password, and saying or depressing the letter "P" to play a particular message. At step 124, the user begins listening to the retrieved message. At step 126, the user decides to record a note with the message, and begins speaking or stating the note. At step 128, the messaging platform detects speech energy from the user telephone 110. In response to detecting the speech from the user, the messaging platform halts playing the retrieved message and begins recording the user's statement or speech utterance. The utterance from the user (the note) can be stored within the message or on a separate file that can be accessed at the end of the voice message (e.g., after the note is recorded, the messaging platform may state to the user at the end of the message,: "You have one note attached to this message, press or say "P" to play this note"). At step 130, the user stops speaking and the messaging platform detects a silence of a minimum amount of time. In response to this silence, the platform continues playing the retrieved message, or begins playing the message at the beginning. In a variation of the second embodiment, a note will be recorded during the playback of a message only after detecting a predetermined word or phrase. For example, during message playback, the platform can use speech recognition to begin recording a note from the user only after the user states, "Begin Note." Other words spoken by the user during message playback do not halt message playback or cause the recording of the note. A second word or phrase can be used to halt or stop the recording of the note. For example, the platform may halt recording the note (and continue playing the message) after the user says, "End Note."

Figure 3:
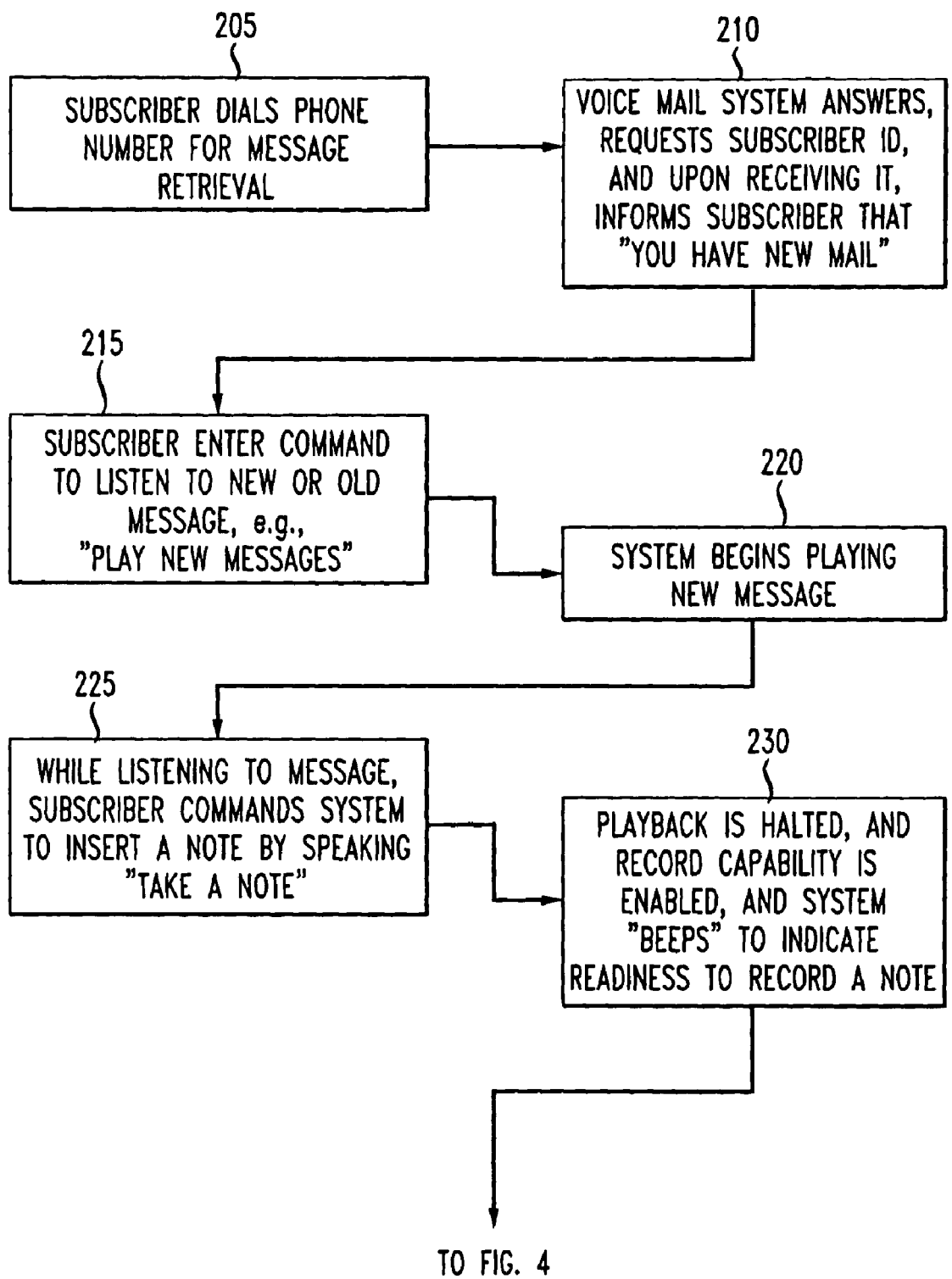
FIGS. 3 and 4 together are a flow diagram of a third embodiment for providing a subscriber with the capability to record an audio note corresponding to a voice message.
Figure 4:
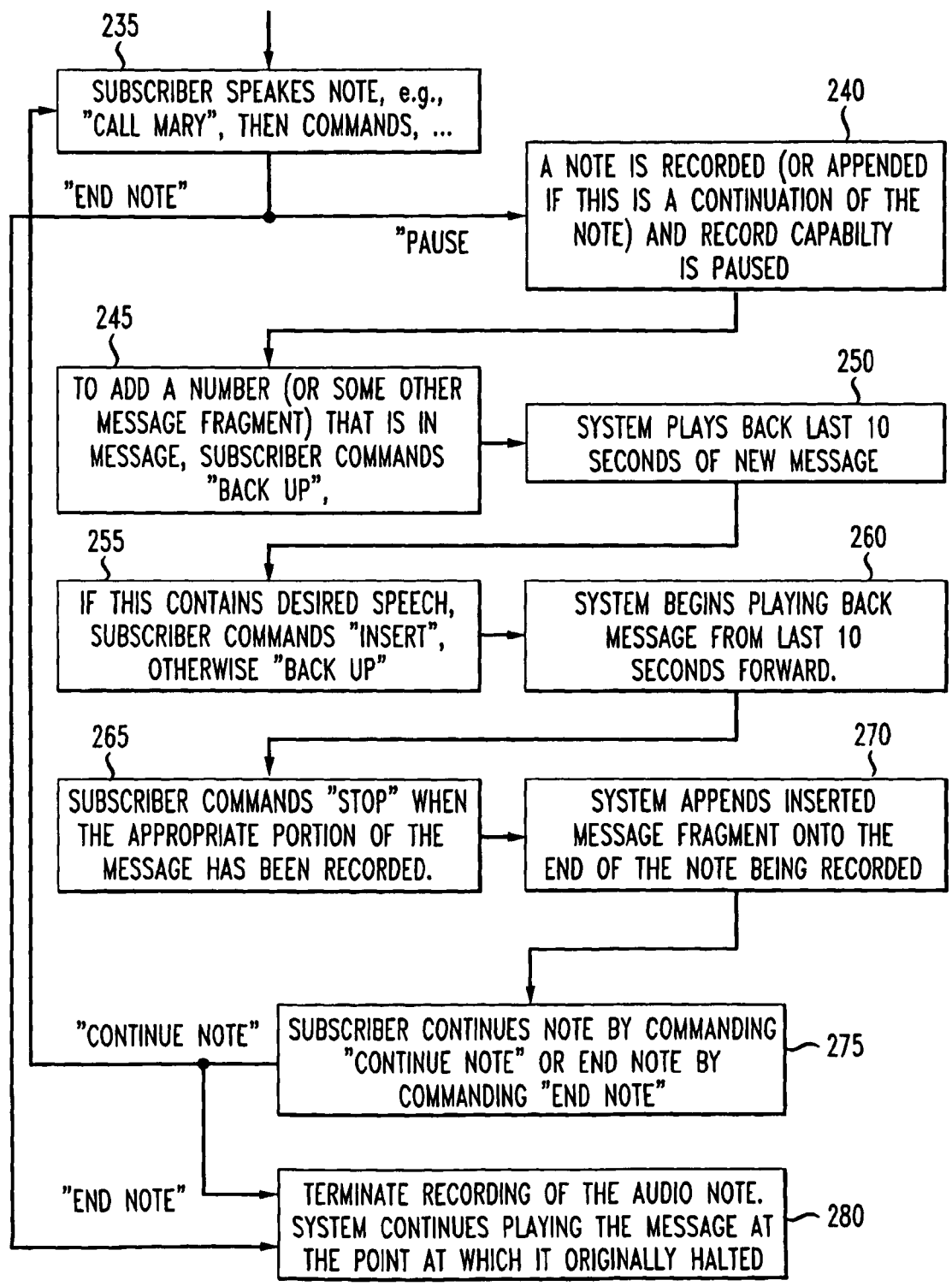

FIGS. 3 and 4 show a third embodiment of the present invention. This embodiment allows the subscriber to insert fragments from a voice message into an audio note. For example, the subscriber may insert a telephone number, address or name from a voice message into a corresponding audio note. At step 205, a subscriber dials a phone number for message retrieval. At step 210, the messaging platform answers, requests the subscriber's identification, and upon receiving it and verifying it, informs the subscriber that the subscriber has new voice messages. At step 215, the subscriber enters the command for listening to new or old voice messages; for example, in a messaging platform with voice recognition, the subscriber may speak the verbal command "play new messages." In response to the subscriber's command, the messaging platform begins playing back the new voice messages at step 220.

At step 225, while listening to a voice message, the subscriber commands the messaging platform to insert an audio note by, for example, speaking the verbal command "take a note." In response to the subscriber's command, at step 230, playback or replay of the voice message is halted, record capability is enabled and the messaging platform beeps to indicate the beginning of recording of an audio note. At step 235, the subscriber speaks an audio note, for example, the audio note "call Mary before 11:00". At step 235, the subscriber commands the messaging platform to either pause the recording or to end the audio note, for example, by speaking the verbal command "pause" or "end note." The "pause" command allows the subscriber to subsequently add a fragment from the voice message to the audio note, if so desired. This feature is particularly useful, for instance, when the voice message contains a phone number, address or name that the subscriber wishes to include in the audio note.

If the subscriber at step 235 speaks the verbal command "end note", then the messaging platform at step 280 terminates recording the audio note and continues playing back or replaying the voice message from the point at which it had halted in step 230. If the subscriber at step 235 speaks the verbal command "pause" then record capability is paused at step 240.

At step 245, the subscriber, to add a fragment from the voice message (e.g., a telephone number recorded in the voice message) to the audio note, speaks the verbal command "backup". In response to this command, the messaging platform at step 250 plays back, for example, the 10 seconds of the voice message appearing before the point of halting of playback at step 230. If the messaging platform at step 250 plays back a speech segment desired by the subscriber, the subscriber speaks the verbal command "insert". Then, the messaging platform at step 260 begins once again to play back, for example, the 10 seconds of the voice message appearing before the point of halting of playback at step 230. The subscriber at step 265 may issue the verbal command "stop" when the segment of the voice message intended for insertion into the audio note has completed play back. Then, the messaging platform at step 270 appends the inserted message fragment onto the end of the audio note being recorded. If at step 255, the subscriber instead of speaking the verbal command "insert", speaks the verbal command "back up", then the messaging platform at step 260 starts playing back the voice message from a point 10 seconds further behind the point of beginning playback at step 250 (i.e., the messaging platform begins playback of the voice message at a point 20 seconds before the point of halting of playback at step 230.) Then, steps 265 and 270 are executed in the same manner as described before.

At step 275, the subscriber can continue recording the audio note by speaking the verbal command "continue note". In that case, flow returns to step 235. If, however, the subscriber at step 275 speaks the verbal command "end note," then the messaging platform at step 280 terminates recording the audio note and continues playing back or replaying the voice message from a point near the point at which it had halted in step 230. For example, the voice message may be played back from a point half a second or a few seconds before the point at which playback of the message had halted at step 230.

Many alternatives to the embodiment just described are possible that do not depart from the spirit and scope of the invention. For example, the subscriber may use the keys on her telephone to issue commands to the messaging platform instead of speaking verbal commands. The messaging platform may allow review for purposes of identifying segments of the current voice message for insertion into the audio note (e.g. at steps 250 and 260 in FIG. 4) in intervals greater or less than 10 seconds, or in variable intervals. The messaging platform could allow more than one audio note to be recorded for each voice message. Moreover, part of the functionality of the system for taking audio notes may reside on a device on the subscriber's side; for example, phone numbers in speech segments from voice messages that are inserted into audio notes may also be automatically stored on the subscriber's phone or communication device, allowing the subscriber to dial these numbers directly and without calling the messaging platform. For example, the user's handheld device may contain a speech-to-text converter that is triggered by the "insert" command and that is connected to a directory on the handheld device. Thus, when the user issues the "insert" command, the fragment from the voice message is not only copied into the audio note, but is also written to the directory on the handheld device.

Figure 5:
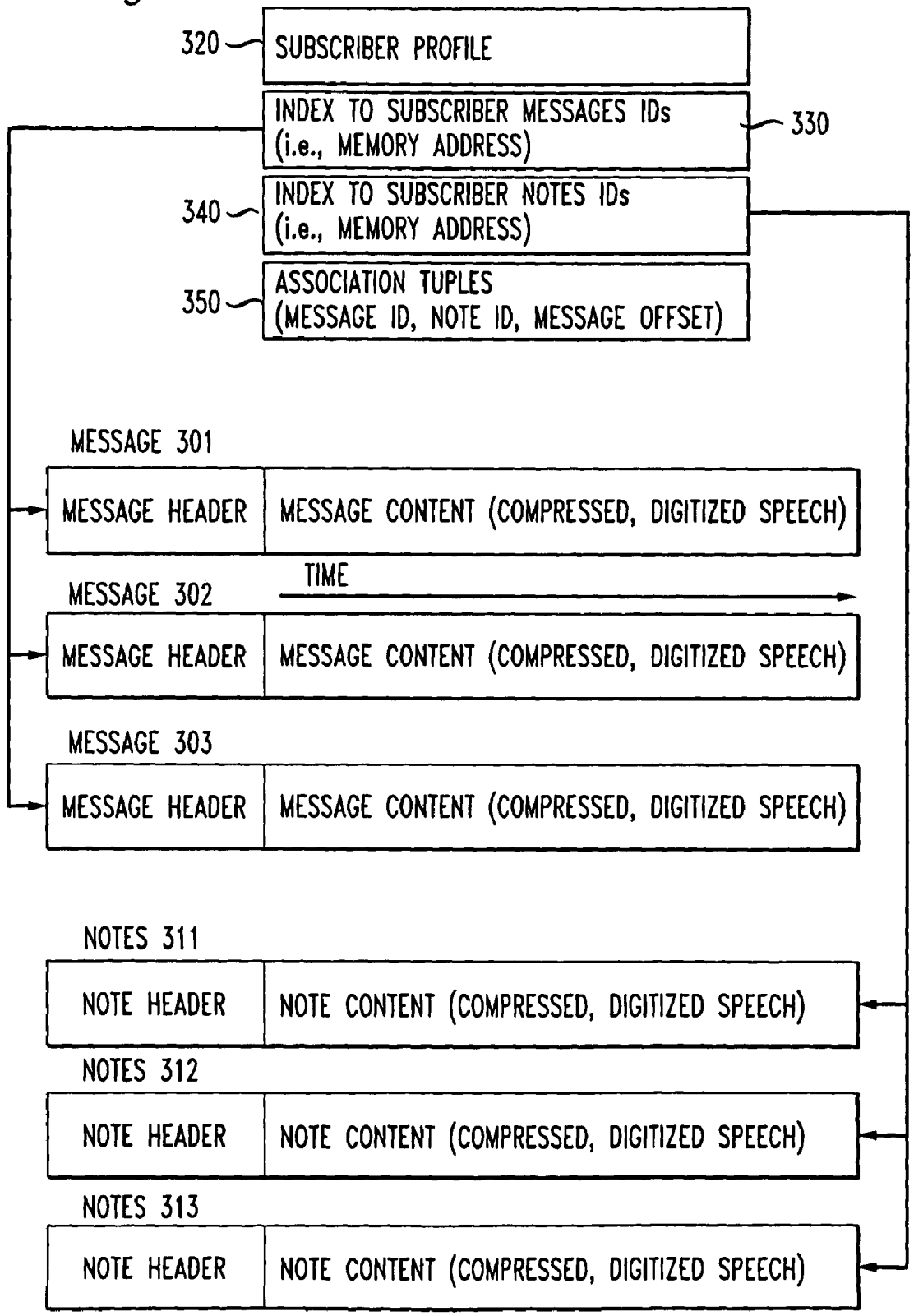
FIG. 5 illustrates a possible indexing scheme that can be used to retrievably associate audio notes with their corresponding voice messages.

FIG. 5 shows one possible implementation for indexing messages and audio notes in embodiments of the present invention. The indexing information for the voice messages and audio notes of a particular subscriber is contained in subscriber profile 320. Subscriber profile 320 contains an index to subscriber message identification information 330 which contains the memory addresses of the beginning point of each of the voice messages of the subscriber. Subscriber profile 320 also contains an index to subscriber note identification information 340, which contains the memory addresses of the beginning points of each of the audio notes of the subscriber.

Subscriber profile 320 also contains the association tuples 350 for the subscriber. The association tuples 350 comprise a table containing a number of row entries with each row entry corresponding to one audio note of the subscriber. A particular row entry contains the message identification number of the voice message corresponding to the audio note, the note identification number of the audio note, and a message offset. Message identification numbers can be assigned consecutively with the earliest received voice message being assigned the smallest message identification number. Similarly, note identification numbers can be assigned to the audio notes corresponding to a particular voice message such that the earliest recorded audio note is assigned the smallest note identification number. The message offset for a particular voice message and a particular audio note corresponding to that voice message is the time on the voice message at which point the audio note was begun to be annotated onto the voice message.

FIG. 5 also shows examples of the structure of stored voice messages and audio notes. In particular, FIG. 5 shows the structure of voice message 301, voice message 302, voice message 303, audio note 311, audio note 312 and audio note 313. Each voice message is comprised of a message header and message content in compressed digitalized format. The message header may contain information identifying the voice message such as the message identification number and may contain additional information. FIG. 5 also indicates that in this implementation for this embodiment, time is measured from the beginning of the message content for purposes of determining the message offset for a particular audio note annotated onto the voice message. Similarly, an audio note is comprised of a note header and note content in compressed digital format. The note header may contain note identification information such as the note identification number and other information.

The implementation for an indexing scheme for an embodiment of the present invention as shown in FIG. 5 retrievably associates audio notes with their corresponding voice messages. This is so because the information stored in a subscriber profile, including the indices to subscriber message and subscriber note identification information as well as the information stored in the message headers and note headers, is sufficient to allow the easy retrieval of an audio note given a corresponding voice message and vice versa. For example, a digital computer can be programmed to perform such retrieval given the structures shown in FIG. 5 in a manner that is apparent to one skilled in the art.

Alternatively, instead of an indexing scheme which tracks the location within a voice message where the audio note was inserted, the audio note may be associated with its corresponding voice message by either i) the insertion of information identifying the voice message corresponding to the audio note in a header to the audio note; ii) the insertion of information identifying all audio notes corresponding to a voice message in a header to the voice message; or iii) storing a table or tables in a memory identifying audio notes corresponding to voice messages. Because an audio note and its corresponding voice message can be stored independently, either can be accessed even after deletion of the other.

Figure 8:
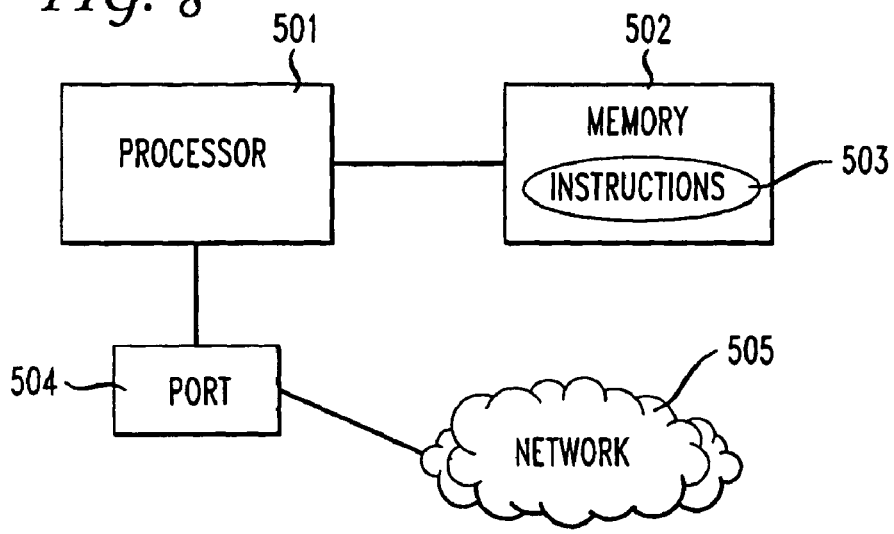
FIG. 8 is an apparatus embodiment of the present invention in which a memory coupled to a processor stores instructions adapted to be executed on the processor.

FIG. 8 shows an apparatus embodiment of the present invention. In FIG. 8, processor 501 is coupled to memory 502 that stores instructions 503 adopted to be executed on processor 501. The instructions 503 may include the steps of any method embodiment of the present invention, e.g., the steps in the embodiment shown in FIG. 1. Processor 501 is also coupled to port 504. Port 504 in turn is coupled to network 505. In another apparatus embodiment, processor 501, memory 502 (including instructions 503 stored in memory 502) and port 504 may be components of a voice mail server connected to network 505. The voice mail server may have speech recognition capability or DTMF cut-through capability allowing a subscriber to interrupt playback of a voice message to record an audio note.

Figure 9:
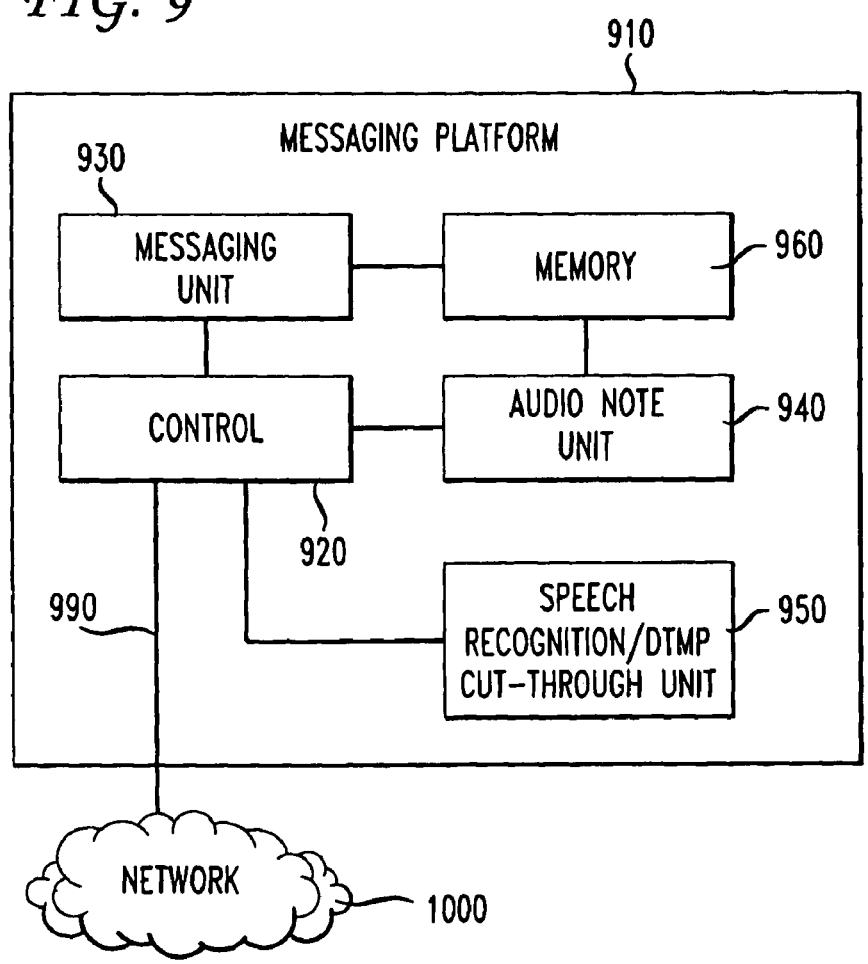
FIG. 9 shows an apparatus embodiment of the present invention in which a messaging platform includes a messaging unit, a memory, an audio note unit, a speech recognition/ DTMF cut-through unit and a control unit.

FIG. 9 shows another apparatus embodiment of the present invention. This embodiment includes messaging platform 910 which has controller unit 920, messaging unit 930, audio note unit 940, speech recognition/DTMF cut-through unit 950 and memory 960. Controller 920 is connected through communications path 990 to network 1000, and is also connected to each of messaging unit 930, audio note unit 940 and speech recognition/DTMF cut-through unit 950. Controller 920 controls the operations of the messaging platform and may include a processor and a memory. Alternatively, controller 920 may also be connected to memory 960.

Speech recognition/DTMF cut-through unit 950 allows both the subscriber and non-subscribers to communicate with and control controller 920 to perform a variety of functions. For example, a non-subscriber may issue a command to controller 920 to begin recording a voice message for the subscriber by pressing a key on a hand-held device or speaking a command, which may be recognized by the speech recognition/DTMF cut-through unit 950 and executed by controller 920. Similarly, a subscriber may issue a command to controller 920 to begin playback of the subscriber's voice messages, or to begin recording an audio note, by pressing a key or speaking a command, which may be recognized by the speech recognition/DTMF cut-through unit 950 and executed by controller 920. A speech recognition/DTMF cut-through unit as used herein may allow a subscriber or non-subscriber to communicate with and control controller 920 by either the subscriber pressing one or more keys on a hand-held device or the subscriber speaking a command, or by both methods.

Messaging unit 930 contains the functionality of an answering machine, allowing network users to call and leave messages for subscribers. Audio note unit 940 allows a subscriber to record audio notes and will be described in greater detail below. Memory 960 stores voice messages and audio notes.

A network user calling a subscriber may be connected to messaging platform 910 when the subscriber does not answer the call. Controller 920, determining that the caller is not the subscriber, may enable messaging unit 930 to record a voice message, which is stored in memory 960. Controller 920 may determine that caller is not a subscriber, for instance, upon the caller's failing to speak or enter a code during a certain interval of time. A spoken or entered code may be detected by the speech recognition/DTMF cut-through unit 950 and communicated to controller unit 920.

If a subscriber calls or contacts messaging platform 910, controller unit 920, determining that the caller is a subscriber, may enable messaging unit 930 to playback the subscriber's messages, which are stored in memory 960. Again, the controller 920 may determine that the caller is a subscriber upon the subscriber's speaking or entering a code that is detected by the speech recognition/DTMF cut-through unit 950 and communicated to controller unit 920. During playback of a voice message, the subscriber may speak or enter a command to interrupt playback of the voice message and record an audio note. The spoken or entered command may be detected by the speech recognition/DTMF cut-through unit 950 and communicated to controller unit 920. Controller unit 920 then may disable messaging unit 930 and enable audio note unit 940 to record an audio note in memory 960.

After recording the audio note, the subscriber may speak or enter a command to terminate the audio note and continue playing the voice message. The speech recognition/DTMF cut-through unit 950 may detect this command and communicate it to the controller unit 920, which may disable audio note unit 940 and enable messaging unit 930 to resume playing the voice message.

A subscriber may call or contact messaging platform 910 to retrieve an audio note. After controller 920 determines that the caller is a subscriber as described earlier, the caller may retrieve audio notes stored in memory 960 by speaking or entering a command that is detected by the speech recognition/DTMF cut-through unit 950 and communicated to controller unit 920. The controller 920 may then enable the audio note unit 940 to playback one or more audio notes stored in memory 960.

Many alternatives to this embodiment are possible that do not depart from the scope or spirit of the present invention. For example, controller unit 920 may be a logical unit such that its functionality is split among various components of messaging platform 910. Messaging unit, audio note unit, speech recognition/DTMF cut-through unit may also be logical units whose functionality are split among various components of messaging platform 910. Additionally, messaging platform 910 may be able to service a plurality of subscribers instead of a single subscriber.

In conclusion, a novel method and apparatus for recording an audio note on a messaging platform have been disclosed, in which a special device on the subscriber's side is not necessary. Embodiments of the invention overcome the limitations and disadvantages of known systems, and allow for a messaging platform with the capability to take audio notes without the distribution of a player/recorder unit to each subscriber; without maintenance of any special device on the subscriber's side; without necessitating the recall of any device from the subscriber for software upgrades; with minimal risk of unauthorized copying of software; and with convenient billing capability not requiring the upload of a usage log from the subscriber's side.

What is claimed is:

1. A method for recording an audio note for a voice message stored on a messaging platform, the method comprising:
   playing the voice message from the messaging platform to a connected subscriber device;
   recording an audio note received from a subscriber via the subscriber device; and
   associating the audio note with the voice message by inserting into a header of the audio note information identifying the voice message.

2. The method of claim 1, further comprising, prior to recording the audio note:
   receiving a record command, during the playing of the voice message and from the subscriber device and in response to the record command, suspending the playing of the voice message.

3. The method of claim 1, further comprising:
   completing the play of the voice message after completion of the recording of the audio note.

4. The method of claim 1, wherein at least one of the audio note and the voice message is stored in compressed digital format.

5. The method of claim 1, further comprising the additional step of playing the recorded audio note from the messaging platform through the network after the recording step.

6. The method of claim 2, further comprising the additional step of resuming play of the voice message from a point near a point of suspension of the voice message, after the recording step.

7. The method of claim 1, wherein playing the voice message is suspended upon detection that a verbal command was issued.

8. The method of claim 1, wherein playing the voice message is suspended upon detection that a phone key was pressed.

9. The method of claim 1, wherein the recording step is executed upon detection that a verbal command was issued.

10. The method of claim 1, wherein the recording step is executed upon detection that a phone key was pressed.

11. A method for recording an audio note for a voice message, the voice message stored on a messaging platform, the method comprising:
    retrieving a voice message;
    recording speech from the at least one subscriber device as an audio note onto the messaging platform; and
    associating the audio note with the voice message by inserting into a header of the audio note information identifying the voice message.

12. The method of claim 11, further comprising, prior to recording the speech:
    beginning playing back the voice message;
    detecting speech energy from at least one subscriber device during playback; and
    halting playback of the voice message.

13. The method of claim 11, further comprising:
    completing playback of the voice message after recording the speech.

14. An apparatus for recording an audio note for a voice message, the apparatus comprising:
    at least one processor; and
    at least one memory coupled to the at least one processor, the at least one memory storing at least one voice message and instructions adapted to be executed by the at least one processor, the instructions comprising:
        recording an audio note transmitted through the network the audio note has no portion common to a portion of the voice message; and
        associating the audio note with the voice message by inserting into a header of the audio note information identifying the voice message.

15. The apparatus of claim 14, wherein the instructions further comprise:
    playing the at least one voice message from the at least one memory to a subscriber;
    receiving a record command from the subscriber; and
    in response to the record command, suspending the play of the voice message.

16. The apparatus of claim 14, wherein the instructions further comprise:
    completing the playing of the voice message after completion of the recording of the audio note.

17. The apparatus of claim 16, wherein the instructions include the resumption of play of the at least one voice message from a point near a point of suspension of the voice message, after the recording instruction.

18. The apparatus of claim 16, wherein the instructions provide that play of the voice message is suspended upon detection that a verbal command was issued.

19. The apparatus of claim 16, wherein the instructions provide that play of the voice message is suspended upon detection that a phone key was pressed.

20. A messaging platform for recording an audio note for a voice message, the messaging platform comprising:
    an audio note unit connected to the controller that records and plays back audio notes recorded by a person listening to voice messages;
    a memory connected to the at least one of the messaging unit, the audio note and the controller; and
    a unit that associates each of the audio notes with a corresponding one of the voice message by inserting into a header of each of the audio notes information identifying the corresponding one of the voice messages.

21. The messaging platform of claim 20, further comprising:
    at least one of a speech recognition unit and a DTMF cut-through unit, the at least one unit detecting commands issued by a caller;
    a controller connected to the at least one unit and the at least one network that responds to commands communicated from the at least one unit and controls operations of the messaging platform;
    a messaging unit connected to the controller that records and plays back voice messages; and
    a recording unit that records at least one segment from one of the voice messages in one of the audio notes upon detection of a verbal command.

* * * * *